(12) United States Patent
Abrams (10) Patent No.: US 7,390,552 B2
(45) Date of Patent: *Jun. 24, 2008

(54) FLOCKED TRANSFER AND ARTICLE OF MANUFACTURING INCLUDING THE FLOCKED TRANSFER

(75) Inventor: Louis Brown Abrams, County of Larimer, CO (US)

(73) Assignee: High Voltage Graphics, Inc., Fort Collins, CO (US)

( * ) Notice: Subject to any disclaimer, the term of this patent is extended or adjusted under 35 U.S.C. 154(b) by 429 days.

This patent is subject to a terminal disclaimer.

(21) Appl. No.: 10/670,091

(22) Filed: Sep. 23, 2003

(65) Prior Publication Data

US 2004/0058120 A1 Mar. 25, 2004

Related U.S. Application Data (63) Continuation of application No. 09/621,830, filed on Jul. 24, 2000.

(51) Int. Cl.
*B32B 33/00* (2006.01)
*B05D 1/14* (2006.01)
*B05D 1/16* (2006.01)

(52) U.S. Cl. .............................. 428/90; 428/86; 428/95; 428/97

(58) Field of Classification Search .................. 428/90, 428/86, 95, 97
See application file for complete search history.

(56) References Cited

U.S. PATENT DOCUMENTS

| | | | |
|---|---|---|---|
| D66,035 S | 11/1924 | McIntosh | D6/593 |
| 1,905,989 A | 4/1933 | Safir et al. | 428/189 |
| D108,581 S | 2/1938 | Robinson | D6/583 X |
| D114,814 S | 5/1939 | Hoos | D6/593 |
| D122,192 S | 8/1940 | De Moreau | D6/593 |
| D125,860 S | 3/1941 | Haas | D6/593 |
| D162,533 S | 3/1951 | Goldfarb | D6/593 |
| 2,592,602 A | 4/1952 | Saks | |

(Continued)

FOREIGN PATENT DOCUMENTS

AT      E 93 557      8/1988

(Continued)

OTHER PUBLICATIONS

U.S. Appl. No. 29/058,551, filed Aug. 19, 1996, Abrams.

(Continued)

*Primary Examiner*—Cheryl Juska
(74) *Attorney, Agent, or Firm*—Sheridan Ross P.C.

(57) ABSTRACT

A flocked transfer is produced by applying a release agent to a release sheet and then applying the flocking to the release agent. Unlike the traditional method, a binder and hot melt film is not applied to the back of the flock. The transfer (which is essentially a flocked release sheet) is then applied to a substrate (i.e., an item of clothing, a rubber pad, etc.) by positioning a sheet of thermosetting hot melt film on the substrate; placing the transfer on the hot melt film with the flock in contact with the hot melt film; and applying heat and pressure. The heat melts the thermosetting hot melt film to bind the flock to the substrate and binds the flocking together. This method reduces the costs involved in producing flocked articles, especially for articles produced on a continuous basis.

34 Claims, 3 Drawing Sheets

U.S. PATENT DOCUMENTS

| | | | |
|---|---|---|---|
| 2,636,837 A | 4/1953 | Summers | 154/123 |
| 2,916,403 A | 12/1959 | Calderwood | |
| 2,999,763 A | 9/1961 | Sommer | |
| D195,245 S | 5/1963 | Edesess | D6/583 |
| 3,215,584 A | 11/1965 | McConnell et al. | |
| 3,314,845 A | 4/1967 | Perri | |
| 3,377,232 A | 4/1968 | Mencock et al. | |
| 3,459,579 A | 8/1969 | Newman | |
| 3,496,054 A | 2/1970 | Baigas | |
| 3,529,986 A | 9/1970 | Kappas et al. | 117/17 |
| 3,565,742 A * | 2/1971 | Stephens et al. | 428/356 |
| 3,622,434 A | 11/1971 | Newman | |
| 3,639,149 A | 2/1972 | Spalding | |
| 3,644,267 A | 2/1972 | Jackson, Jr. et al. | |
| 3,657,060 A | 4/1972 | Haigh | 161/73 |
| 3,660,200 A | 5/1972 | Anderson et al. | |
| 3,674,611 A * | 7/1972 | Petry et al. | 428/319.7 |
| 3,772,132 A | 11/1973 | Dulin, Jr. | |
| 3,775,205 A | 11/1973 | Hermann et al. | 156/72 |
| 3,793,050 A | 2/1974 | Mumpower, Jr. | 117/17.5 |
| 3,803,453 A | 4/1974 | Hull | |
| 3,816,060 A | 6/1974 | Koskolos | 431/350 |
| 3,816,211 A | 6/1974 | Haigh | 156/309 |
| 3,837,946 A | 9/1974 | Gribbin | |
| 3,887,737 A * | 6/1975 | Baxter et al. | 428/90 |
| 3,900,676 A | 8/1975 | Alderson | |
| 3,903,331 A | 9/1975 | Klein | |
| 3,917,883 A | 11/1975 | Jepson | |
| 3,936,554 A | 2/1976 | Squier | |
| 3,956,552 A | 5/1976 | Geary | 428/88 |
| 3,961,116 A | 6/1976 | Klein | |
| 3,969,559 A | 7/1976 | Boe | |
| 3,979,538 A * | 9/1976 | Gilman et al. | 428/90 |
| 3,989,869 A | 11/1976 | Neumaier et al. | 428/254 |
| 4,018,956 A | 4/1977 | Casey | 428/86 |
| 4,025,678 A | 5/1977 | Frank | |
| 4,031,281 A * | 6/1977 | Keeling | 428/90 |
| 4,034,134 A | 7/1977 | Gregorian et al. | 428/88 |
| 4,035,532 A | 7/1977 | Gregorian et al. | 428/90 |
| 4,062,992 A * | 12/1977 | Power et al. | 428/90 |
| 4,088,708 A | 5/1978 | Riew | |
| 4,102,562 A | 7/1978 | Harper et al. | 350/105 |
| 4,120,713 A | 10/1978 | Jensen et al. | 156/72 |
| 4,142,929 A | 3/1979 | Otomine et al. | 156/72 |
| 4,160,851 A | 7/1979 | Lienert et al. | 427/379 |
| 4,201,810 A | 5/1980 | Higashiguchi | 428/90 |
| 4,218,501 A | 8/1980 | Kameya et al. | |
| 4,269,885 A | 5/1981 | Mahn | 428/216 |
| 4,273,817 A | 6/1981 | Matsuo et al. | 428/90 |
| 4,282,278 A | 8/1981 | Higashiguchi | 428/90 |
| 4,292,100 A | 9/1981 | Higashiguchi | 156/72 |
| 4,294,641 A | 10/1981 | Reed et al. | |
| 4,308,296 A * | 12/1981 | Chitouras | 427/505 |
| 4,314,813 A | 2/1982 | Masaki | 8/468 |
| 4,314,955 A | 2/1982 | Boden et al. | 264/51 |
| 4,340,623 A | 7/1982 | Justus | 427/361 |
| 4,340,632 A | 7/1982 | Wells et al. | |
| 4,352,924 A | 10/1982 | Wooten et al. | |
| 4,362,773 A | 12/1982 | Shikinami | |
| 4,369,157 A | 1/1983 | Conner | 264/246 |
| 4,370,374 A | 1/1983 | Raabe et al. | |
| 4,385,588 A | 5/1983 | Bennetot | 118/638 |
| 4,387,214 A | 6/1983 | Passmore et al. | |
| 4,388,134 A | 6/1983 | Long et al. | 156/248 |
| 4,390,387 A * | 6/1983 | Mahn | 428/90 |
| 4,396,662 A | 8/1983 | Higashiguchi | 428/90 |
| 4,405,401 A | 9/1983 | Stahl | 156/248 |
| 4,418,106 A * | 11/1983 | Landler et al. | 428/89 |
| 4,423,106 A | 12/1983 | Mahn | 428/207 |
| 4,430,372 A | 2/1984 | Knoke et al. | |
| 4,438,533 A | 3/1984 | Hefele | |
| 4,446,274 A * | 5/1984 | Okazaki et al. | 524/812 |
| 4,465,723 A | 8/1984 | Knoke et al. | |
| 4,510,274 A * | 4/1985 | Okazaki et al. | 523/411 |
| 4,539,166 A | 9/1985 | Richartz et al. | 264/45.1 |
| 4,574,018 A | 3/1986 | Masuda et al. | 156/72 |
| 4,582,658 A | 4/1986 | Reichmann et al. | 264/45.1 |
| 4,588,629 A | 5/1986 | Taylor | |
| 4,610,904 A * | 9/1986 | Mahn et al. | 428/79 |
| 4,650,533 A | 3/1987 | Parker et al. | |
| 4,652,478 A | 3/1987 | Maii | 428/43 |
| 4,668,323 A | 5/1987 | Lenards et al. | 156/242 |
| 4,670,089 A * | 6/1987 | Hanson | 216/35 |
| 4,681,791 A | 7/1987 | Shibahashi et al. | 428/96 |
| 4,687,527 A | 8/1987 | Higashiguchi | 156/72 |
| 4,741,791 A | 5/1988 | Howard et al. | 156/72 |
| 4,790,306 A | 12/1988 | Braun et al. | 128/206.12 |
| 4,793,884 A | 12/1988 | Horikiri | 156/247 |
| 4,797,320 A | 1/1989 | Kopp et al. | 428/316.6 |
| 4,810,321 A | 3/1989 | Wank et al. | 156/244.23 |
| 4,810,549 A | 3/1989 | Abrams et al. | 428/88 |
| 4,812,247 A | 3/1989 | Fahner et al. | 252/511 |
| 4,834,502 A | 5/1989 | Bristol et al. | D14/114 X |
| 4,895,748 A | 1/1990 | Squires | |
| 4,931,125 A | 6/1990 | Volkmann et al. | |
| 4,980,216 A | 12/1990 | Rompp | 428/90 |
| 5,008,130 A | 4/1991 | Lenards | 427/206 |
| 5,009,950 A | 4/1991 | Wagner et al. | 428/290 |
| 5,026,591 A | 6/1991 | Henn et al. | 428/198 |
| 5,041,104 A | 8/1991 | Seal | |
| 5,043,375 A | 8/1991 | Henning et al. | 524/372 |
| 5,047,103 A | 9/1991 | Abrams et al. | 156/72 |
| 5,053,179 A | 10/1991 | Masui et al. | 264/257 |
| 5,059,452 A | 10/1991 | Squires | |
| 5,077,116 A | 12/1991 | Lefkowitz | |
| 5,108,530 A | 4/1992 | Niebling, Jr. et al. | 156/245 |
| 5,112,423 A | 5/1992 | Liebe, Jr. | |
| 5,115,104 A * | 5/1992 | Bunyan | 174/35 GC |
| 5,154,871 A | 10/1992 | Wagner et al. | 264/255 |
| 5,198,277 A | 3/1993 | Hamilton et al. | 428/92 |
| 5,207,851 A | 5/1993 | Abrams | |
| 5,217,563 A | 6/1993 | Niebling et al. | 156/382 |
| 5,217,781 A | 6/1993 | Kuipers | 428/85 |
| 5,248,536 A | 9/1993 | Du Katz | 428/40 |
| 5,274,039 A | 12/1993 | Sirinyan et al. | 525/130 |
| 5,306,567 A | 4/1994 | Kuo et al. | |
| 5,338,603 A * | 8/1994 | Mahn et al. | 428/349 |
| 5,346,746 A | 9/1994 | Abrams | 428/195 |
| 5,350,474 A | 9/1994 | Yamane | 156/240 |
| 5,350,830 A | 9/1994 | Kuo et al. | |
| 5,358,789 A | 10/1994 | Kuo et al. | |
| 5,383,996 A | 1/1995 | Dressler | |
| D365,342 S | 12/1995 | Evenson et al. | D14/114 |
| D366,654 S | 1/1996 | Lovegrove et al. | D14/114 |
| 5,489,359 A | 2/1996 | Yamane | 156/540 |
| 5,529,650 A * | 6/1996 | Bowers et al. | 156/64 |
| 5,534,099 A | 7/1996 | Yamamoto | 156/230 |
| 5,564,249 A * | 10/1996 | Borys et al. | 52/716.5 |
| 5,597,637 A | 1/1997 | Abrams et al. | 428/90 |
| 5,622,587 A | 4/1997 | Barthelman | 156/251 |
| 5,693,400 A | 12/1997 | Hamilton et al. | 428/89 |
| D391,572 S | 3/1998 | Lee | |
| 5,762,379 A | 6/1998 | Salmon et al. | 283/91 |
| 5,766,397 A | 6/1998 | Jones | 156/230 |
| 5,771,796 A | 6/1998 | Morrison et al. | |
| 5,804,007 A | 9/1998 | Asano | 156/72 |
| 5,858,156 A | 1/1999 | Abrams et al. | 156/230 |
| 5,900,096 A | 5/1999 | Zemel | 156/233 |
| 5,912,065 A | 6/1999 | Kukoff | 428/195 |
| 5,922,436 A | 7/1999 | Banfield et al. | 428/100 |
| 5,981,009 A | 11/1999 | Iacono et al. | 428/40.1 |
| 6,010,764 A | 1/2000 | Abrams | 428/90 |
| 6,083,332 A | 7/2000 | Abrams | 156/72 |
| 6,102,686 A | 8/2000 | Eschenfelder | 425/388 |

| | | | | | | |
|---|---|---|---|---|---|---|
| 6,110,560 | A | 8/2000 | Abrams ................ 428/90 | FR | 2846202 | 4/2004 |
| 6,113,149 | A | 9/2000 | Dukatz ................ 283/91 | GB | 1171296 A * | 11/1969 |
| 6,146,485 | A | 11/2000 | Iacono et al. ............ 156/230 | GB | 1 447 049 | 8/1976 |
| 6,170,881 | B1 | 1/2001 | Salmon et al. ............ 283/91 | GB | 1 466 271 | 3/1977 |
| 6,171,678 | B1 | 1/2001 | Holeschovsky et al. ...... 428/97 | GB | 2 065 031 | 6/1981 |
| 6,202,549 | B1 | 3/2001 | Mitsam et al. ............ 101/27 | GB | 2 126 951 A1 | 4/1984 |
| 6,224,707 | B1 | 5/2001 | Lion ................ 156/230 | GB | 2214869 | 9/1989 |
| 6,247,215 | B1 | 6/2001 | Van Alboom et al. | GB | 0506601 | 9/1992 |
| 6,249,297 | B1 | 6/2001 | Lion ................ 347/171 | IE | 55104 | 4/1984 |
| 6,257,866 | B1 | 7/2001 | Fritz et al. ............ 425/387.1 | IE | 55104 | 5/1990 |
| 6,264,775 | B1 | 7/2001 | Holeschovsky et al. ...... 156/72 | IT | 0329767 | 8/1993 |
| 6,277,312 | B1 | 8/2001 | Hansen et al. ............ 264/132 | IT | 24637BE/96 | 6/1996 |
| 6,296,908 | B1 | 10/2001 | Reihs et al. ............ 427/393.5 | JP | 52-155270 | 12/1977 |
| 6,299,715 | B1 | 10/2001 | Langsdorf et al. ........ 156/72 | JP | 54-163934 | 12/1979 |
| 6,350,504 | B1 | 2/2002 | Alboom et al. | JP | 55079143 | 6/1980 |
| 6,376,041 | B1 | 4/2002 | Morrison et al. | JP | 55-147171 | 11/1980 |
| 6,387,472 | B1 | 5/2002 | Reck et al. ............ 428/195 | JP | 356058824 A | 5/1981 |
| 6,428,877 | B1 | 8/2002 | Suss et al. ............ 428/195 | JP | 56 108565 | 8/1981 |
| 6,436,506 | B1 | 8/2002 | Pinter et al. | JP | 56107080 | 8/1981 |
| 6,451,148 | B1 | 9/2002 | Jenner ................ 156/230 | JP | 56 141877 | 11/1981 |
| 6,569,538 | B1 | 5/2003 | Kaschel | JP | 58 62027 | 4/1983 |
| 6,660,352 | B2 | 12/2003 | Hsu et al. | JP | 358062027 A | 4/1983 |
| 6,676,796 | B2 | 1/2004 | Pinter et al. | JP | 59 115885 | 7/1984 |
| 7,229,680 | B1 | 6/2007 | Crompton | JP | 60-171138 | 9/1985 |
| 2001/0008039 | A1 | 7/2001 | Alboom et al. | JP | 60-236738 | 11/1985 |
| 2001/0008672 | A1 | 7/2001 | Norvell et al. | JP | S61-146368 | 7/1986 |
| 2002/0098329 | A1 | 7/2002 | Abrams | JP | 63118544 | 5/1988 |
| 2003/0129353 | A1 | 7/2003 | Abrams | JP | 64-61299 | 3/1989 |
| 2004/0058120 | A1 | 3/2004 | Abrams | JP | 2-25667 | 6/1990 |
| 2004/0170799 | A1 | 9/2004 | Carr et al. | JP | 5-201196 | 8/1993 |
| 2005/0081985 | A1 | 4/2005 | Abrams | JP | 05255021 | 10/1993 |
| 2005/0158508 | A1 | 7/2005 | Abrams | JP | 08-267625 | 10/1996 |
| 2005/0266204 | A1 | 12/2005 | Abrams | JP | 10059790 | 3/1998 |
| 2005/0268407 | A1 | 12/2005 | Abrams | JP | 11277662 A * | 10/1999 |
| 2006/0026778 | A1 | 2/2006 | Lion | JP | 11348159 A * | 12/1999 |
| 2006/0029767 | A1 | 2/2006 | Lion | JP | 02000084977 | 3/2000 |
| 2006/0251852 | A1 | 11/2006 | Abrams | JP | 2000-094563 | 4/2000 |
| 2007/0003761 | A1 | 1/2007 | Miyazono et al. | JP | 2000-208564 | 7/2000 |
| 2007/0022548 | A1 | 2/2007 | Abrams | JP | 2001270019 | 10/2001 |
| 2007/0026189 | A1 | 2/2007 | Abrams | KR | 220373 | 9/1999 |
| 2007/0102093 | A1 | 5/2007 | Abrams | KR | 2003063833 A * | 7/2003 |
| 2007/0110949 | A1 | 5/2007 | Abrams | NO | 306099 | 6/1989 |
| 2007/0148397 | A1 | 6/2007 | Abrams | TW | 62640 | 7/1993 |
| | | | | WO | WO 79/01146 | 12/1979 |
| | | FOREIGN PATENT DOCUMENTS | | WO | WO 89/01829 | 3/1989 |
| | | | | WO | WO 90/09289 | 8/1990 |
| AT | E 135 427 | 8/1996 | | WO | WO 94/19530 | 9/1994 |
| AU | 606651 | 2/1991 | | WO | WO 02/07959 A1 | 1/2002 |
| AU | 653994 | 10/1994 | | WO | WO 02/09925 A1 | 2/2002 |
| BE | 0506601 | 3/1996 | | WO | WO 02/058854 A1 | 8/2002 |
| CA | 757 595 | 4/1967 | ................ 154/49 | WO | WO 03/031083 A1 | 4/2003 |
| CA | 2010076 | 8/1990 | | WO | WO 2004/005023 | 1/2004 |
| CA | 1306411 | 8/1992 | | WO | WO 2004/005413 | 1/2004 |
| CA | 2064300 | 9/1992 | | WO | WO 2004/005600 | 1/2004 |
| CA | 757 595 | 4/1997 | | WO | WO 2005/035235 | 4/2005 |
| DE | 3883517 | 5/1994 | | WO | WO 2005/118948 | 12/2005 |
| DE | 69208910 | 8/1996 | | ZA | 88/6259 | 4/1990 |
| DE | 197 34 316 A1 | 2/1999 | | ZA | 92/2154 | 2/1993 |
| EP | 0122656 | 10/1984 | | | | |
| EP | 0 210 304 A1 | 2/1987 | | | OTHER PUBLICATIONS | |
| EP | 0 280 296 A2 | 8/1988 | | | | |
| EP | 0 351 079 A3 | 1/1990 | | U.S. Appl. No. 09/548,839, filed Apr. 13, 2000, Abrams. | | |
| EP | 0506601 A1 | 9/1992 | | U.S. Appl. No. 10/614,399, filed Jul. 3, 2003, Abrams. | | |
| EP | 0506601 | 5/1996 | | U.S. Appl. No. 10/614,340, filed Jul. 3, 2003, Abrams. | | |
| EP | 0 685 014 B1 | 6/1997 | | U.S. Appl. No. 10/613,982, filed Jul. 3, 2003, Abrams. | | |
| EP | 0913271 A1 | 10/1998 | | U.S. Appl. No. 10/613,981, filed Jul. 3, 2003, Abrams. | | |
| EP | 0 989 227 A2 | 3/2000 | | U.S. Appl. No. 10/455,575, filed Jun. 4, 2003, Abrams. | | |
| FR | 1.480.860 | 5/1967 | | U.S. Appl. No. 10/455,541, filed Jun. 4, 2003, Abrams. | | |
| FR | 2.210.149 | 7/1974 | | U.S. Appl. No. 10/394,357, filed Mar. 21, 2003, Abrams. | | |
| FR | 2543984 | 10/1984 | | U.S. Appl. No. 10/265,206, filed Oct. 4, 2002, Abrams. | | |
| FR | 2 659 094 | 3/1990 | | U.S. Appl. No. 09/735,721, filed Dec. 13, 2000, Abrams. | | |
| FR | 2 784 619 | 10/1998 | | U.S. Appl. No. 09/629,746, filed Jul. 31, 2000, Abrams. | | |
| FR | 2 784 619 | 4/2000 | | U.S. Appl. No. 09/621,830, filed Jul. 24, 2000, Abrams. | | |

"Automotive/Industrial Division: Industrial Adhesives"; *Bostik Findley*; 2000-2001; 3 pgs.
Declaration of L. Brown Abrams for U.S. Appl. No. 09/621,830 executed Jan. 7, 2003; 2 pgs.
"Flocking: A Touch of Velour"; H. Wolf & Sons Inc.; Apr. 1987; 5 pgs.
"Fish"; *Wired*; Nov. 1998; p. 68.
"Lextra MouseRug: About the Product"; *MouseRug*; before Jan. 27, 1999; 2 pgs.; http://www.MOUSERUG.com/mouserug/aboutmouserugs.html.
Abrams, Brown, "Flocking A Touch of Velour" ScreenPrinting (Apr. 1987).
Abrams, Brown, "Part II: Flocking" *ScreenPrinting* (Jun. 1987).
U.S. Appl. No. 10/394,357, filed Mar. 21, 2003, Abrams.
Declaration of L. Brown Abrams under 37 CFR § 1.98 for U.S. Appl. No. 09/621,830 dated Jan. 16, 2004, 2 pages.
"A Rug Fit for a Mouse," *Time Magazine* (Sep. 28, 1998) p. 96.
Declaration of L. Brown Abrams under 37 CFR §1,132. For U.S. Appl. No. 09/621,830 dated Jan. 7, 2003.
Landwehr; "When is a mouse pad really a rug?" *The Denver Business Journal* (Nov. 1998), at http://denver.bizjournals.com/denver/stories/1998/11/30/story3.html.
Lextra® MouseRug®; "Dimensions"(Jan. 27, 1999), http://www.mouserug.com/mouserug/dimensions.html, 1 page.
Lextra® MouseRug®; "MouseRug Components" (Jan. 27, 1999), http://www.mouserug.com/mouserug/mousecomp.html, 1 page.
"Magic Carpet," *Wired* (Nov. 1998), p. 68.
"New pads for computer mice now cutting a different rug," *USA Today* (Oct. 26, 1998), p. D1.
"Rugs for Rodents," *Newsweek* (Nov. 9, 1998), p. 8.
Office Action Summary dated Apr. 22, 2005 for U.S. Appl. No. 10/455,541.
Office Action Summary dated Apr. 28, 2005 for U.S. Appl. No. 10/455,575, 14 pages.
European Search Report, issued Jan. 12, 2006, in European Patent Application No. 01998050.7.
Dec. 30, 2005 Supplemental First Office Action, Chinese Application No. 01814634.1 (English translation provided only).
Oct. 27, 2005 Office Action In Re Application Of Louis Brown Abrams; U.S. Appl. No. 10/455,541; filed Jun. 4, 2003.
Oct. 8, 2002 Office Action In Re Application Of Louis Brown Abrams; U.S. Appl. No. 09/621,830; filed Jul. 24, 2000.
Oct. 5, 2005 Office Action In Re Application Of Louis Brown Abrams; U.S. Appl. No. 09/735,721; filed Dec. 13, 2000.
Oct. 8, 2002 Office Action In Re Application Of Louis Brown Abrams; U.S. Appl. No. 09/735,721; filed Dec. 13, 2000.
Oct. 28, 2005 Office Action In Re Application Of Louis Brown Abrams; U.S. Appl. No. 10/455,575; filed Jun. 4, 2003.
Mar. 23, 2006 Office Action In Re Application Of Louis Brown Abrams; U.S. Appl. No. 10/455,575; filed Jun. 4, 2003.
Apr. 5, 2006 Office Action In Re Application Of Louis Brown Abrams; U.S. Appl. No. 10/455,541; filed Jun. 4,2003.
Mar. 13, 2006 Office Action In Re Application Of Louis Brown Abrams; U.S. Appl. No. 09/735,721; filed Dec. 13, 2000.
Jan. 11, 2007 Office Action In Re Application of Louis Brown Abrams; U.S. Appl. No. 10/455,541; filed Jun. 4, 2003.
Jan. 10, 2007 Office Action in Re Application of Louis Brown Abrams; U.S. Appl. No. 10/455,575; filed Jun. 4, 2003.
U.S. Appl. No. 11/460,493, filed Jul. 27, 2006, Abrams.
"Flockin' to Precision"; Images Magazine; Feb. 1992, 1 page.
"RMIUG Meeting Minutes—Colorado in the Information Age"; Jan. 14, 1997; 1 page.
Agion Technologies, LLC., The Most Advanced Antimicrobial Silver Delivery System, date unknown.
Artisyn Synthetic Paper 165, Printability Product Specification Sheet, Mar. 1999, 2 pages.
Artisyn Synthetic Paper 165, Printability Product Specification Sheet, May 1997, 1 page.
Bayer Plastics Division Press Release, Wheel Covers, Center Caps Become Revolving Art Forms with New Film Insert Molding Technology, Jun. 19, 2000; 4 pages.
Bostik USA; Web & Powder Adhesives; 2000; 2 pgs.

Bostik, "Technical Data Sheet PE103 Web Adhesives", revised Feb. 7, 2006, 5 pages.
Cellusuede Products, Inc, "About Flock", Available at http://www.cellusuede.com/navabout.html, KMK Media Group, copyright 2000, 1 pages.
Cellusuede Products, Inc, "FAQ's", Available at http://www.cellusuede.com/faq.html, KMK Media Group, copyright 2000, 2 pages.
Cellusuede Products, Inc, "Fiber Types", Available at http://www.cellusuede.com/about/types.html, KMK Media Group, copyright 2000, 4 pages.
Cellusuede Products, Inc, "Glossary of Terms", Available at http://www.cellusuede.com/glossary/index.html, KMK Media Group, copyright 2000, 2 pages.
Cellusuede Products, Inc, "Uses for Flock, Home Furnishings", Available at http://www.cellusuede.com/home.html, KMK Media Group, copyright 2000, 2 pages.
Changpad Trading Inc.; Heat-Trans Pad; Jan. 27, 1999, available at http://www.changpad.com.tw/heat-trans.htm, 1 page.
Computer Current (Nov. 9, 1998).
Defosse; "Systems Approach Gives Blow Molders Big Edge", 2000.
Fake Fur Computer Accessories; Products; Jan. 27, 1999, available at http://workwares.com.au/products.htm, 3 pages..
JC Penney Catalog, Fall & Winter, accent rugs, A-B, p. 1032, 2000 design library (1991).
Sears Catalog, Spring/ Summer, bath carpets, (B), fringed oblong, pp. 1290-1291, oriental design rugs, A-B, p. 1146, 2000 design library (1978).
Shaner, Ken, "Advanced Molding Processes: Low Pressure Molding/Low-High Pressure Molding for Interior Trim," Automotive & Transportation Interior Expo Conference 1997, Session 9, pp. 1-2.
Snyder, Merle R., "Fabric Molding Shows Promise in Automotive: Machine Makers Offer Innovative Systems That Boost Productivity and Facilitate Recyclability," Modern Plastics (Oct. 1999), available at http://www.modplas.com/new/month_1099/ms10.htm.
Sonics & Materials, Inc., "Chart II Compatability of Thermoplastics" (undated), 1 page.
Stahls', New Product Bulletin; 7 pages, date unknown.
Takatori, Hiroyuki, "Dieprest In-mold Laminate Technology," Automotive & Transportation Interiors Expo Conference 1999, Session 12, pp. 1-4.
Declaration of L. Brown Abrams Under 37 CFR § 1.98 for U.S. Appl. No. 09/735,721 dated Jan. 16, 2004, 2 pages.
Declaration of L. Brown Abrams under 37 CFR 1.132 for U.S. Appl. No. 09/735,721 dated Jan. 7, 2003.
First Report on Australian Patent Application No. 2001280771, mailed Jun. 3, 2005.
First Report on Australian Patent Application No. 2002249810, mailed Oct. 20, 2005.
Report No. 2 on Australian Patent Application No. 2001280771, mailed Jun. 2, 2006.
First Office Action (with translation) dated Apr. 1, 2005 for Chinese Patent Application No. 01821885.7, 8 pages.
First Office Action issued Jul. 17, 2006, in European Patent Application No. 01998050.7.
International Preliminary Examination Report for International Application No. PCT/US01/23195, mailed Jun. 20, 2002.
International Preliminary Examination Report for PCT/US01/48615, mailed Nov. 14, 2003.
International Search Report for International Application No. PCT/US01/23195, mailed Oct. 30, 2001.
International Search Report for International Application No. PCT/US01/48615, mailed Jun. 17, 2002.
Office Action, Chinese Application No. 01814634.1 from Dec. 30, 2005 (English translation provided).
Official Action for U.S. Appl. No. 09/621,830, mailed Jun. 29, 2006.
Official Action for U.S. Appl. No. 09/621,830, mailed Nov. 15, 2006.
Official Action for U.S. Appl. No. 09/735,721, mailed Nov. 15, 2006.
"Bicomponent Fibers", available at http://web.utk.edu/~mse/pages/Textiles/Bicomponent%20fibers.htm, Updated Apr. 2004, 8 pages.
Report for Canadian Patent Application No. 2,415,680, issued Apr. 17, 2007.
Rejection Decision for Chinese Application No. 01814634.1, issued Apr. 6, 2007.

Invitation pursuant to Article 96(2) and Rule 51(2) EPC, dated Jun. 26, 2007, in European Patent Application No. 01998050.7.
Official Action for U.S. Appl. No. 09/621,830, mailed May 16, 2007.
Official Action for U.S. Appl. No. 09/735,721, mailed May 16, 2007.
Official Action for U.S. Appl. No. 10/455,541, mailed Jun. 25, 2007.
Official Action for U.S. Appl. No. 10/455,575, mailed Jun. 20, 2007.
First Office Action dated Oct. 7, 2005 for U.S. Appl. No. 09/621,830.
Notice of Allowance for U.S. Appl. No. 09/621,830, mailed Oct. 2, 2007.
Notice of Allowance for U.S. Appl. No. 09/735,721, mailed Dec. 12, 2007.
Notice of Allowance for U.S. Appl. No. 10/455,541, mailed Jan. 15, 2008.
Notice of Allowance for U.S. Appl. No. 10/455,575, mailed Jan. 15, 2008.
JP Office action (including translation) for Japanese Patent Application No. 2002-513678, dated Apr. 1, 2008.

* cited by examiner

FLOCKED TRANSFER AND ARTICLE OF MANUFACTURING INCLUDING THE FLOCKED TRANSFER

CROSS-REFERENCE TO RELATED APPLICATIONS

The present application is a continuation of U.S. patent application Ser. No. 09/621,830 filed Jul. 24, 2000. The entire disclosure of the prior application is considered to be part of the disclosure of the present application and is hereby incorporated by reference.

BACKGROUND OF THE INVENTION

This invention relates to flocked transfers, and, in particular, to an improved method of making flocked transfers which can reduce the cost and time required of producing transfers by a significant amount.

Heretofore, flocked transfers have generally been produced by applying a release agent to a release sheet. The flocking is applied to the release sheet in the desired pattern. A binder and a permanent hot melt adhesive are applied to the back of the flocking, and the transfer is allowed to dry. The binder is required hold the flocking in the desired pattern. The hot melt adhesive, which is applied to the transfer as a powder, is used to adhere the transfer to a substrate, such as an article of clothing, a neoprene pad, etc. The transfer is applied to the substrate by placing the transfer on the substrate with the dried hot melt adhesive in contact with the substrate. Heat, such as from an iron, is then applied to the release sheet. The heat melts the hot melt adhesive to cause hot melt adhesive to flow into intimate contact with the substrate, forming a mechanical and molecular bond with the substrate. The release agent then allows for the release sheet to be removed from the transfer, leaving the flocking exposed on the substrate.

This traditional method has worked well for years. However, the method can be improved upon to reduce the cost of producing the transfer, and hence, the cost of the item containing the transfer.

BRIEF SUMMARY OF THE INVENTION

In accordance with the invention, generally stated, a flocked transfer of the present invention is produced by applying a release agent to a release sheet and then applying the flocking to the release agent. Unlike the traditional method, a binder and adhesive are not applied to the ends of the flock.

To form an article of manufacture with the flocked transfer, a thermosetting adhesive film (in the form of a sheet or cut to shape) is positioned on the substrate to which the transfer is to be applied. The thermosetting film is preferably a polyester or polyurethane film, but can be any thermosetting film. The flock with the release adhesive and release sheet (i.e., the transfer) is then placed on the sheet of permanent adhesive film with the release sheet up, so that the flocking is in contact with the permanent adhesive film. Heat is then applied to the transfer. The heat melts the permanent adhesive film, and secures the flock to the substrate. Because the permanent adhesive film is thermosetting, even if it is subsequently subjected to heat, it will not remelt, nor become tacky, and hence, there is no risk of fibers becoming matted down in any of this type of adhesive, which could otherwise ruin the plush pile effect. In addition, it is likely that the use of a thermoset powder could be added to a bond print latex flock adhesive binder, to serve as a method for increasing the adhesion and again reducing the risk of any remelting, or becoming tacky, when the flock transfer is subsequently exposed to heat. It is known that there is a much stronger adhesion with thermosetting materials, because thermoset materials will cross-link with a chemical reaction and thereby adhere the flock fibers to it, which become chemically attached thereto. Through the usage of this invention, the finished flock surface is more plush, soft, because more of the fiber is exposed and extends upwardly out of the adhesive, than with the screen-printed latex, as currently used. Also, this affords better soil release during washing or cleaning because of less fiber/adhesive entanglement occurs with the flock, during application.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, including what I presently believe is the best mode of carrying out the invention.

Figure 1:
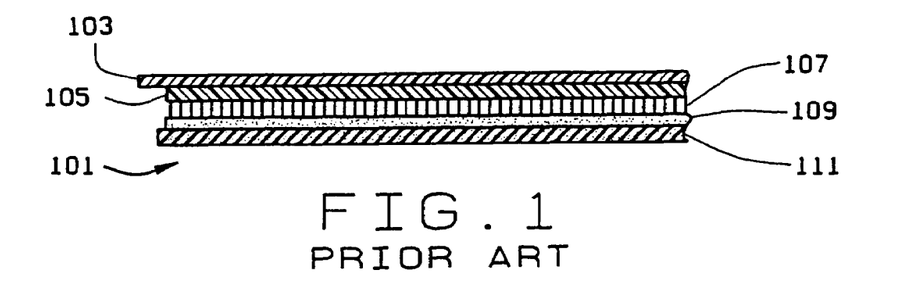
FIG. 1 is a cross-sectional view of a prior art flock transfer.

A prior art flocked transfer 101 is shown in FIG. 1. As is known, such transfers include a dimensionally stable release sheet 103 to which a conventional flock transfer release adhesive 105 is applied in a pattern which corresponds to the overall image to be flocked. The flock 107 is then electrostatically coated into the release adhesive 105. A binder adhesive 109 is applied to the exposed ends of the flock to bind the flock together as a unit. Lastly, a hot melt adhesive film 111 is applied. The transfer is then allowed to dry. The transfer is applied to a substrate, as is known, by positioning the transfer on a substrate, such as a shirt or other item of clothing, with the hot melt adhesive in contact with the substrate, and applying heat to the transfer. The heat activates the hot melt adhesive to adhere the transfer to the substrate.

This process is described in my prior patent, U.S. Pat. No. 4,810,549, as well as in my co-pending application, Ser. No. 09/548,839 filed Apr. 13, 2000, both of which are incorporated herein by reference. In U.S. Pat. No. 4,810,549, a plush textured multicolored flock is disclosed in which differing colors of flock having a length greater than 0.3 mm are applied sequentially to a release adhesive coated base sheet through predetermined areas of masked screens. The applied flock is thereafter coated with a binder adhesive, such as a liquid water-based acrylic (40-60% water), which binds the flock into a unit. In one configuration, the binder adhesive contains an additional adhesive, such as a hot melt, for binding the transfer to a substrate. In an alternative configuration, the hot melt adhesive (which is usually a granular polyester or nylon) is formed as a separate layer. U.S. application Ser. No. 09/548,839, filed Apr. 13, 2000, discloses a mouse pad produced by applying differently colored flock (having a length of 1 mm and 3.3 Dtex) electrostatically through a screen to a release adhesive-coated paper sheet. A binder adhesive, such as a water-based acrylic, is screen printed to the flock after contacting the release adhesive. The binder adhesive may contain a hot melt or the hot melt may be applied to the free surface of the binder adhesive. The hot melt adhesive is bonded to a surface, such as a rubber pad, using heat and pressure. The release adhesive and paper sheet are then removed. In one process configuration, a flock-coated adhesive carrier sheet, a solid pre-formed binder adhesive film or heat seal film, and the rubber base material are thermally fused together in a drying oven.

Figure 2:
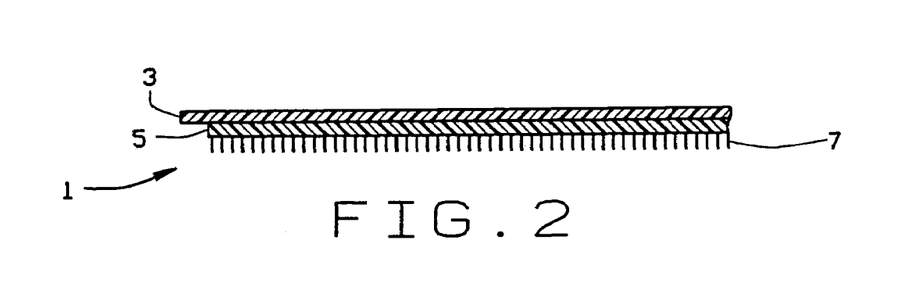
FIG. 2 is a cross-sectional view of a flock transfer of the present invention.

A flocked transfer 1 of the present invention is shown in FIG. 2. The transfer 1 of the present invention includes a release sheet 3 to which a conventional release agent, such as wax, has been applied. The release agent is applied to the sheet in the shape of the pattern of the flocking. Flocking 7 is then applied to the release agent, and hence to the release sheet, to form the transfer. The flocking 7 is applied, for example, in the manner as described in my prior patent, U.S. Pat. No. 4,810,549, which is incorporated herein by reference. Unlike the prior art processes, the transfer 1 of this embodiment is made without the use of a binder adhesive or a hot melt adhesive. As is discussed below, a thermosetting film is used to adhere the transfer to a substrate.

Figure 3:
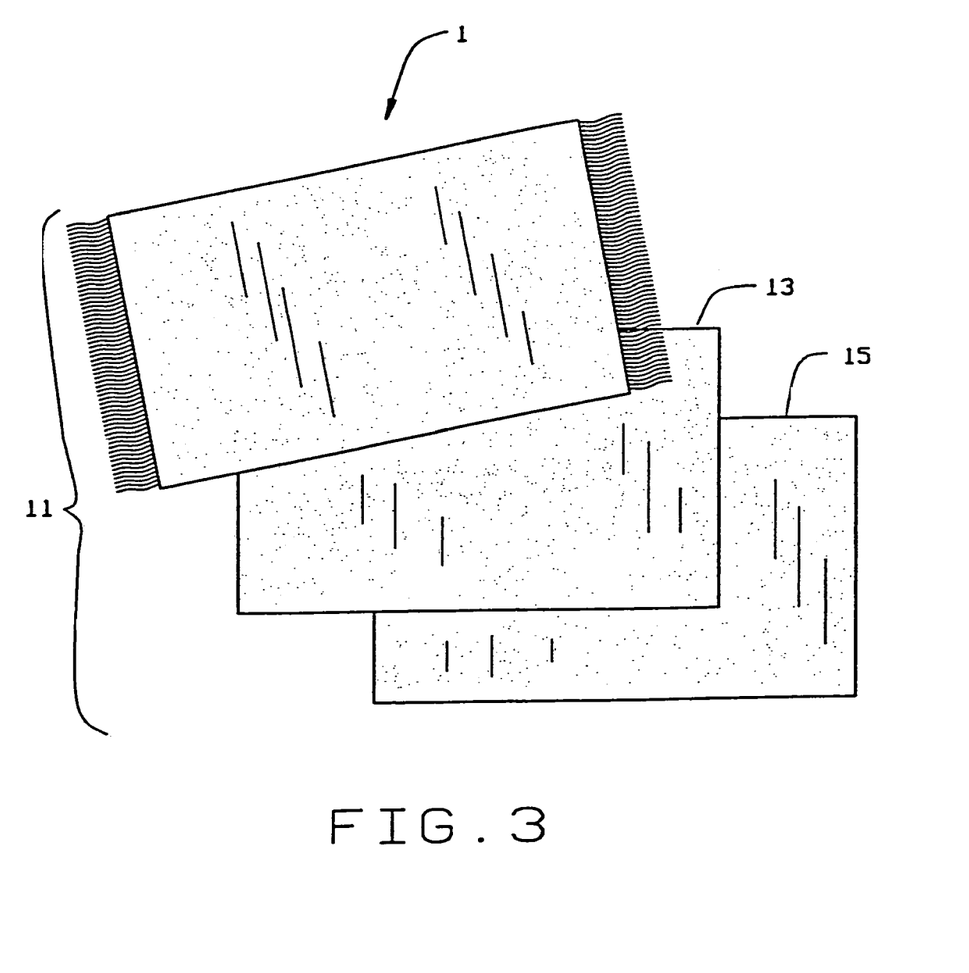
FIG. 3 is an exploded view of the transfer, a permanent adhesive sheet, and a substrate used to make an article of manufacture.
Figure 4:
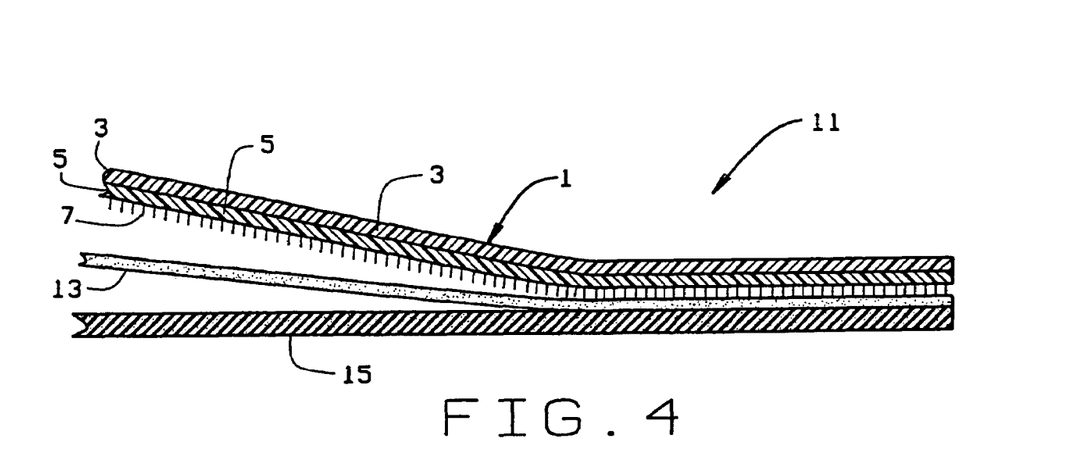
FIG. 4 is a cross-sectional view of an article of manufacture using the transfer of the present invention, showing a part of the transfer applied to part of the substrate and a part of the transfer and permanent adhesive film spaced from the substrate.

With reference to FIG. 3, an article of manufacture, such as an item of clothing having a transfer 1 applied thereto, a mouse pad, coaster, or other item having a flocked surface is easily produced using the transfer 1. The article of manufacture 11 is produced by positioning a hot melt or thermosetting permanent adhesive sheet 13 between a substrate 15 and the flocked release sheet. The sheet is, for example, a sheet of thermosetting polyester, available from Bostik, Inc. The sheet can also be made from a thermosetting polyurethane. Any other thermosetting film should also work well. The substrate can be an item of clothing, a rubber pad (for producing a mouse pad or coaster), etc. The sheet can be precut to correspond to the shape of the transfer 1. The transfer 1 is then positioned on the sheet with the flock 7 against the sheet 13. Heat is applied to the transfer through the release sheet to activate the permanent adhesive sheet. The sheet then acts to both bind the flock 7 together and to adhere the flock 7 to the substrate 15. Preferably, to assemble the article, the flocked release sheet, the permanent adhesive sheet (which is preferably the thermosetting film), and the substrate are brought together and passed through a heat-laminating press where the three parts are subject to temperature of about 300° F. (about 150° C.) and pressure (about 40-50 psi) for about 30 seconds. It has been found that a medium-to-firm pressure has been most advantageous in providing for assembly of this type of plush flocked transfer. The pressure and heat will cause the permanent adhesive sheet to adhere to the flock and the substrate. Additionally, the thermosetting film will cross-link or cure, to give a strong attachment of the flock to the substrate.

Figure 5:
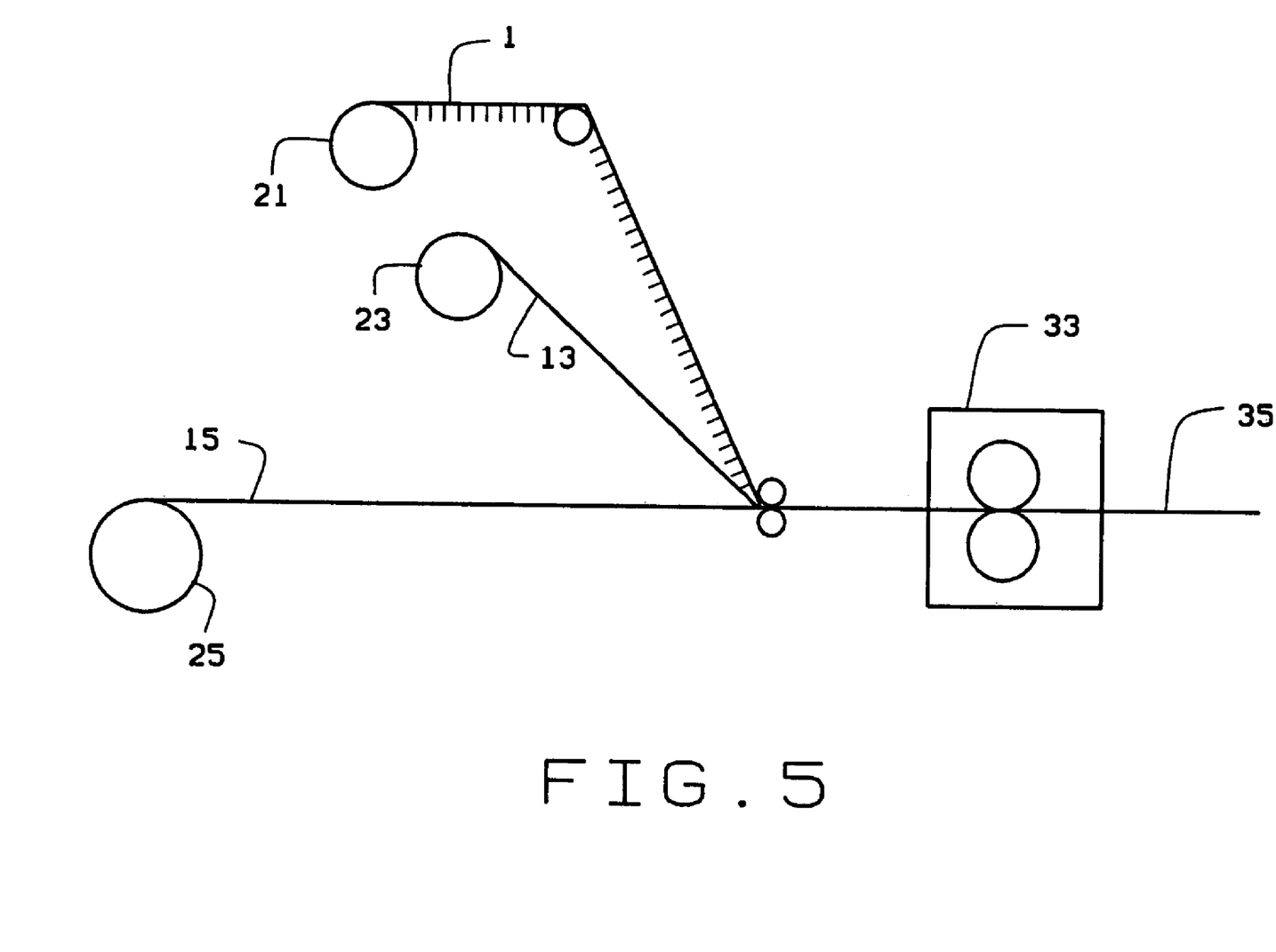
FIG. 5 is a schematic drawing of a process for continuously producing articles of manufacture, such as mouse pads, coasters, etc.

Articles, such as mouse pads or coaster, in which the entire top surface of the article is covered with the flocking can be produced on a continuous basis, as shown in FIG. 5. Rolls 21, 23, and 25 of a flocked release sheet 1, the permanent adhesive sheet 13, and the substrate 15 are provided. The three parts are brought together at a laminating station 33. Rollers can be provided in front of the station 33 so that the three elements are adjacent each other as they enter the laminating station. In the laminating station, heat and pressure are applied to the three sheets (the flocked release sheet, the permanent adhesive sheet, and the substrate) to melt the permanent adhesive sheet. The melted permanent adhesive sheet will then cure or cross-link, as noted above, to adhere the flock to the substrate. A web 35 exits the laminating station. The web 35 is then allowed to cool. The web 35 is ultimately directed to a cutting station where it is cut into individual articles. Once the web 35 is cooled, it can be directed immediately to a cutting station (after the sheet 35 cools), or can it can be wound up on an uptake roller to be cut into individual articles at a later time, or at a different location. At the cutting station, the release sheet is removed from the flock and gathered on an uptake roll or is otherwise disposed of. After the release sheet has been removed from the flock, the substrate with the flock adhered thereto is cut to form the articles 11. It is also likely that one could remove the release liner either before or after the die cutting procedure.

Preferably, the release sheet is flocked and supplied in roll form as shown in FIG. 5. However, the flocking of the release sheet could be made part of the process.

To produce flocked articles, such as shirts, jackets, etc., which cannot be easily flocked on a continuous basis, the permanent adhesive sheet can be applied to the transfer 1 prior to applying the transfer to the substrate. To do this, the thermosetting film is placed in contact with the flock of the transfer, and the transfer and release sheet are heated to a temperature at which the thermosetting film become tacky, but below the temperature at which the thermosetting film begins to cure and cross-link. This will adhere the thermosetting film to the transfer 1 to form a transfer which can later be applied to an article by positioned the transfer with the thermosetting film in position on the article (i.e., piece of clothing) and applying heat and pressure to the transfer, for example, with an iron, sufficient to melt the thermosetting film, to cause the film to cure and cross-link.

The method eliminates two steps from the prior art method: (1) application of the binder adhesive and (2) application, cleaning, sintering, and drying of the hot melt adhesive. In a continuous process, the present method also eliminates a station for applying the binder and hot melt adhesives as well as a station for drying the completed transfer. Because a station is not needed to apply (i.e., print) the binder and hot melt adhesives to the flocking as part of the transfer, the machinery required to produce the article 11 is much less expensive (both in actual costs and in maintenance costs). Additionally, because the binder adhesive and hot melt adhesive is not used, the cost of the article of manufacture is significantly reduced.

As various changes could be made in the above constructions without departing from the scope of the invention, it is intended that all matter contained in the above description or shown in the accompanying drawings shall be interpreted as illustrative and not in a limiting sense.

What is claimed is:

1. A flocked assembly, comprising:
   flock, said flock comprised of first ends and opposing second ends;
   a pre-formed, solid, and self-supporting thermosetting film, wherein substantially all opposing second ends are in contact with and adhered to the thermosetting film; and
   wherein the thermosetting film is:
      free of a binder adhesive positioned between the thermosetting film and flock;
      of substantially uniform thickness;
      substantially flat upper and lower surfaces; and
      is not adhered to a substrate.

2. A transfer comprising the flocked assembly of claim 1.

3. The flocked assembly of claim 2, wherein said first ends of said flock are adhered to a release sheet by a release agent and wherein the thermosetting film contacts said opposing second ends of the flock.

4. The transfer of claim 3, wherein the transfer is free of an acrylic adhesive.

5. The transfer of claim 4, wherein said second ends of the flock are embedded in the thermosetting film and wherein the thermosetting film comprises a thermosetting polyester.

6. The flocked assembly of claim 1, wherein the thermosetting film is a thermosetting polyurethane film or a thermosetting polyester film.

7. The flocked assembly of claim 1, wherein the thermosetting film is precut to correspond to a shape of the transfer and wherein the thermosetting film is a thermosetting polyurethane.

8. The flocked assembly of claim 3, wherein the release agent and release sheet are located on a first surface of the flock and the thermosetting film is positioned on a second surface of the flock and the first and second surfaces are in an opposing relationship.

9. The flocked assembly of claim 1, wherein there is no hot melt thermoplastic adhesive located between the thermosetting film and the flock.

10. The flocked assembly of claim 1, wherein the thermosetting film is not fully crosslinked.

11. The flocked assembly of claim 1, wherein the flock is in direct physical contact with the thermosetting film.

12. The flocked assembly of claim 1, wherein the thermosetting film is not fully activated.

13. The flocked assembly of claim 1, wherein the thermosetting film is continuous.

14. A flocked assembly, comprising:
    flock; and
    a solid, self-supporting thermosetting film, wherein the flock is in contact with and adhered to the thermosetting film, wherein there is no intermediate adhesive positioned between the thermosetting film and flock and wherein the thermosetting film is not adhered to a substrate.

15. The flocked assembly of claim 14, wherein said flock comprised of first ends and opposing second ends, wherein the thermosetting film is pre-formed and self-supporting, wherein substantially all second ends of the flock physically contact the thermosetting film, and wherein the thermosetting film has a substantially uniform thickness and substantially flat upper and lower surfaces.

16. The flocked assembly of claim 14, further comprising:
    a release sheet; and
    a release agent in contact with the release sheet, wherein first ends of said flock are adhered to the release sheet by the release agent and wherein the thermosetting film contacts opposing second ends of the flock.

17. The flocked assembly of claim 16, wherein said second ends of flock are not in contact with a hot melt binder adhesive.

18. The flocked assembly of claim 17, wherein the thermosetting film comprises a thermosetting polyester and wherein the thermosetting film is not in contact with an acrylic or a hot melt thermoplastic adhesive.

19. The flocked assembly of claim 18, wherein the thermosetting film is a thermosetting polyurethane film or a thermosetting polyester film.

20. The flocked assembly of claim 14, wherein the flocked assembly is a transfer, wherein the thermosetting film is precut to correspond to a shape of the transfer, and wherein the thermosetting film is a thermosetting polyurethane.

21. The flocked assembly of claim 14, wherein the thermosetting film is not fully crosslinked.

22. The flocked assembly of claim 14, wherein there is no acrylic or hot melt thermoplastic binder adhesive located between the thermosetting film and the flock.

23. The flocked assembly of claim 14, wherein the flock is in direct physical contact with the thermosetting film.

24. The flocked assembly of claim 14, wherein the thermosetting film is not fully activated.

25. The flocked assembly of claim 14, wherein the flock is embedded in the thermosetting film.

26. A flocked assembly, having:
    flock; and
    a self-supporting thermosetting film that is not adhered to a substrate and acts as the adhesive for the flock, wherein there is no binder adhesive located intermediate to said thermosetting film and said flock.

27. The flocked assembly of claim 26, wherein said flock is comprised of first ends and opposing second ends, wherein the thermosetting film is a pre-formed solid, wherein substantially all second ends of the flock contact the thermosetting film, and wherein the thermosetting film has a substantially uniform thickness and substantially flat upper and lower surfaces.

28. The flocked assembly of claim 26, further having:
    a release sheet;
    a release agent in contact with the release sheet, wherein first ends of said flock are adhered to the release sheet by the release agent; and
    wherein the thermosetting film:
        contacts opposing second ends of the flock,
        comprises a thermosetting polyester, and
        is not in contact with an acrylic or a hot melt thermoplastic adhesive.

29. The flocked assembly of claim 26, wherein the thermosetting film is a thermosetting polyurethane film or a thermosetting polyester film.

30. The flocked assembly of claim 26, wherein the flocked assembly is a transfer, wherein the thermosetting film is precut to a shape of the transfer, and wherein the thermosetting film is a thermosetting polyurethane.

31. The flocked assembly of claim 26, wherein the thermosetting film is not fully crosslinked.

32. The flocked assembly of claim 26, wherein there is no acrylic or hot melt thermoplastic binder adhesive located between the thermosetting film and the flock.

33. The flocked assembly of claim 26, wherein the flock is in direct physical contact with and embedded in the thermosetting film.

34. The locked assembly of claim 26, wherein the thermosetting film is not fully activated.

* * * * *